(12) United States Patent
Nakayama et al.

(10) Patent No.: US 7,398,678 B2
(45) Date of Patent: Jul. 15, 2008

(54) PROBE FOR A SCANNING MICROSCOPE

(75) Inventors: Yoshikazu Nakayama, 9-404, 14-2, Korigaoka 1-chome, Hirakata-city, Osaka (JP) 573-0084; Takashi Okawa, Osaka (JP); Shigenobu Yamanaka, Osaka (JP); Akio Harada, Osaka (JP); Masatoshi Yasutake, Shizuoka (JP); Yoshiharu Shirakawabe, Shizuoka (JP)

(73) Assignees: Yoshikazu Nakayama, Osaka (JP); Daiken Chemical Co., Ltd., Osaka (JP); SII Nanotechnology, Inc., Chiba (JP)

( * ) Notice: Subject to any disclaimer, the term of this patent is extended or adjusted under 35 U.S.C. 154(b) by 371 days.

(21) Appl. No.: 11/145,869

(22) Filed: Jun. 6, 2005

(65) Prior Publication Data

US 2006/0150720 A1    Jul. 13, 2006

(30) Foreign Application Priority Data

Jun. 9, 2004    (JP)    ............................. 2004-171794

(51) Int. Cl.
*G01B 5/28* (2006.01)
(52) U.S. Cl. ........................................ 73/105
(58) Field of Classification Search ............... None
See application file for complete search history.

(56) References Cited

U.S. PATENT DOCUMENTS

2005/0112791 A1 *    5/2005    Davis et al. ............... 438/50

* cited by examiner

*Primary Examiner*—Robert R Raevis
(74) *Attorney, Agent, or Firm*—William L. Androlia; H. Henry Koda

(57) ABSTRACT

A scanning microscope probe in which a palladium covering film is formed on the surface of the protruding portion of a cantilever, and the base end portion of a nanotube is disposed in contact with the palladium covering film with the tip end portion of the nanotube protruding to the outside, thus allowing the tip end to be used as a probe needle end for detecting signals. A coating film is formed to cover all or part of the surface of this base end portion, and the nanotube is thus firmly fastened to the cantilever. Since the base end portion adheres tightly to the palladium covering film, both of them are electrically continuous. This palladium covering film allows, as an electrode film, the application of a voltage to the nanotube or the passage of an electric current through the nanotube, showing also good adhesion to the nanotube and cantilever.

3 Claims, 7 Drawing Sheets

PROBE FOR A SCANNING MICROSCOPE

BACKGROUND OF THE INVENTION

1. Field of the Invention

The present invention relates to a probe for a scanning microscope which uses a nanotube as a probe needle thereof and more particularly to a probe for a scanning microscope in which the nanotube and a cantilever are made electrically continuous by means of a palladium covering film so that a voltage can be applied across the nanotube and sample.

2. Description of the Related Art

So as to image the structure of a sample surface by means of an atomic force microscope (abbreviated as "AFM"), a probe needle that is caused to contact or closely approach the sample surface and extract a signal is required. Conventionally, cantilevers made of silicon or silicon nitride in which a protruding portion (called a "pyramid portion") is formed on the tip end of the cantilever have been known as such probe needles. Conventional cantilevers are manufactured using micro-fabrication techniques such as lithography, etching or the like. Such cantilevers sense the inter-atomic force of the sample surface with the tip end of the protruding portion; consequently, the imaging precision is determined by the sharpness of the tip end of the protruding portion. Accordingly, semiconductor working techniques that mainly include an oxidation process and an oxidation film etching process have been used for sharpening the tip end of the protruding portion that constitutes the probe needle. However, there are limits to the miniaturization that can be achieved even in electric current semiconductor working techniques; accordingly, there are also physical limits to the sharpness of the tip end of the above-described protruding portion. Meanwhile, carbon nanotubes have been discovered as a novel carbon structure. Such carbon nanotubes combine the most superior conditions as AFM probe needles.

In this area, H. Dai et al. have reported an AFM probe in which a carbon nanotube is bonded to the tip end of the protruding portion of a cantilever (see NATURE, Vol. 384, p. 147, 1996). The probe of these researchers was a breakthrough probe; however, this probe showed a tendency for the carbon nanotube to fall off of the protruding portion. In order to solve this weak point, the inventors of the present application developed fastening methods in which a carbon nanotube is firmly fastened to the protruding portion of a cantilever. The results of this development were disclosed in Japanese Patent Application Laid-Open (Kokai) Nos. 2000-227435 and 2000-249712.

In the above-described first fastening method, the base end portion of the nanotube is irradiated with an electron beam so that a coating film is formed, and the nanotube is fastened to the protruding portion of the cantilever by being coated by this coating film. The second fastening method is a method in which an electric current is passed through the base end portion of the nanotube, so that the base end portion of the nanotube is fastened to the cantilever protruding portion by fusion.

As described above, commercially marketed cantilevers are produced using semiconductor working techniques, and the material of such cantilevers is silicon or silicon nitride. While silicon is a semiconductor, silicon nitride is an insulator. Accordingly, even if a conductive carbon nanotube is fastened to the protruding portion of such a cantilever, it is difficult to apply a voltage across the nanotube probe needle and the sample, or to cause an electric current to flow through the probe needle, since the cantilever itself does not possess conductivity.

In cases where the probe does not possess conductivity, this means that the use of the probe is severely restricted. More specifically, in conventional methods, the sample surface shape is merely detected via the amount of mechanical deformation of the nanotube; information relating to physical properties such as the mechanical characteristics of the sample surface and the like cannot be obtained. In cases where the probe possesses conductivity, a voltage can be applied across the probe and the sample, and an electric current can be caused to flow, so that physical properties such as the distribution of electrical resistance and the like can be measured. However, in cases where the probe does not possess conductivity, such voltage application and electric current flow are impossible, so that the electrical operation of the nanotube is impossible, thus limiting the effectiveness of the probe. For example, in a probe in which electrical operation is impossible, limits arise in terms of the operability in depositing atoms, moving atoms and extracting atoms on the sample surface. It appears that the working of samples by such manipulation of atoms will be a basic 21st century technology comparable to bio-technology. The inability to perform electrical operations on a nanotube leads to a restriction of the future possibilities of the probe itself.

Accordingly, in Japanese Patent Application Laid-Open (Kokai) No. 2002-162336, the inventors of the present application developed a probe for use in a conductive scanning microscope. In this patent, a technique is proposed in which a conductive covering film is formed on a cantilever, and the nanotube and conductive covering film are caused to be electrically continuous. For example, the conductive covering film is formed by vacuum evaporation, ion plating or sputtering of a metal.

However, carbon nanotubes consist of a carbonaceous material, and there has been almost no research on metal materials that can be tightly bonded to carbon nanotubes. Accordingly, if the wrong metal material is selected, the carbon nanotube may insulated from the metal coating film so that the electrical continuity is interrupted, or the conductivity may be insufficient.

BRIEF SUMMARY OF THE INVENTION

Accordingly, it is an object of the present invention to provide a probe for a scanning microscope that places the nanotube probe needle and the cantilever in a favorable state of electrical continuity in which electrical operations are executable the probe has an improved conductive performance and durability against electric current flow.

The above object is accomplished by a unique structure of the present invention for a scanning microscope which obtains information relating to the physical properties of the surface of a sample by means of the tip end of a nanotube probe needle fastened to a cantilever; and in the present invention (the first aspect of the present invention), the probe is constructed from a palladium covering film formed on the surface of a specified portion of the above-described cantilever, and a nanotube which is fastened so that the base end portion of this nanotube contacts the surface of the above-described palladium covering film and the tip end portion of this nanotube is caused to protrude from the cantilever.

In this structure of the present invention, all or part of the nanotube base end portion that contacts the palladium covering film can be fastened from above by means of a coating film when the nanotube is fastened to the surface of the above-described palladium covering film (the second aspect of the present invention).

Instead, in the present invention, all or part of the nanotube base end portion that contacts the palladium covering film can be fastened by means of fusion to the palladium covering film when the nanotube is fastened to the surface of the above-described palladium covering film (the third aspect of the present invention).

Furthermore, in the present invention, a conductive covering film can be formed from above to cover the base end portion of the nanotube fastened to the surface of the above-described palladium covering film, thus further securing the electrically continuous state of the nanotube and palladium covering film (the fourth aspect of the present invention).

In this structure, the conductive covering film can be formed so as to cover the tip end portion of the nanotube (the fifth aspect of the present invention).

The above-described conductive covering film can be constructed from a magnetic substance (the sixth aspect of the present invention).

Instead, the above-described conductive covering film can be constructed from a palladium covering film to which ferromagnetic metal atoms are added (the seventh aspect of the present invention).

The above described object is further accomplished by another unique structure of the present invention for a scanning microscope which obtains information relating to the physical properties of the surface of a sample by means of the tip end of a nanotube probe needle fastened to a cantilever; and in the present invention (the eight aspect of the present invention), the probe is constructed from a nanotube, which is fastened to the surface of a cantilever so that the tip end portion of this nanotube is caused to protrude from the cantilever, and a palladium covering film, which is formed so that the base end portion of this nanotube and a specified region on the surface of the cantilever are covered by this palladium covering film; and the above-described nanotube and palladium covering film are provided in an electrically continuous state.

In this structure, the palladium covering film can be formed from palladium or a palladium alloy (the ninth aspect of the present invention).

The above-described first aspect of the present invention is characterized in that a palladium covering film is formed on the surface of a specified portion of the cantilever, and the base end portion of the nanotube is fastened in contact with this palladium covering film, so that electric current can pass through the nanotube probe needle.

Conventionally, in cases where the cantilever was endowed with conductivity as a probe needle for detecting an electric current, gold (Au) or platinum (Pt) was used as the electrode material. From this standpoint, the inventors of the present application experimentally used an Au coating film or Pt coating film as the conductive covering film on the cantilever. However, it was found experimentally that it is extremely difficult to confirm electrical continuity between a cantilever surface coated with an Au coating film or Pt coating film and the nanotube probe needle. In the case of an Au coating film, it was found that the coating film is not uniformly formed on the surface of the nanotube; and it was also found that contamination tends to adhere to the cantilever surface that is coated with an Au coating film. Furthermore, in the field of transistors that use semiconductor carbon nanotubes (semiconductor CNTs), titanium (Ti), which has good compatibility of the work function with CNT, has been used for the electrodes. However, it has been found experimentally that since Ti is easily oxidized, a Ti coating film is quickly oxidized when exposed to the atmosphere, resulting in that the film is converted into titanium oxide, which does not possess conductivity. Accordingly, it appears that the use of Ti electrodes as a conductive covering film on AFM probes used in the atmosphere is unsuitable.

Accordingly, the inventors of the present application hit upon the idea of using palladium (Pd) as a metal material. The inventors discovered that palladium has extremely superior properties that allow the uniform formation of a thin film on the cantilever surface; and this discovery led to the perfection of the present invention. It has also been experimentally ascertained that such a palladium covering film shows extremely high bonding with carbon nanotubes compared to Au, Pt and Ti. The reason for such a superior adhesive strength is unknown at the present time. Van der Waals force or covalent bonding is conceivable as one theory; furthermore, it is also conceivable that ion bonds, metal bonds or hydrogen bonds appear when other types of atoms are added to the nanotube. The inventors of the present application confirmed by experimental research that a palladium covering film shows strong adhesion to a cantilever surface formed from silicon, silicon nitride or the like; and this discovery led to the perfection of the present invention. Accordingly, the palladium covering film not only endows the probe needle with conductivity, but also has the ability to fasten the nanotube probe needle firmly to the cantilever. Furthermore, the palladium covering film is uniformly and continuously deposited on the nanotube surface so that a thin film is formed, and so that good conductivity can be imparted. In addition, the palladium covering film is extremely stable, and it has been experimentally confirmed by the inventors of the present application that the yield in the manufacture of conductive scanning microscope probes shows a conspicuous increase compared to the Au coating films, Pt coating films and Ti coating films used in conventional electrodes.

In the second aspect of the present invention, since a coating film is formed on all or part of the base end portion of the nanotube disposed on the palladium covering film on the surface of the cantilever, firm fastening is achieved so that the nanotube does not fall off of the cantilever. Since the base end portion of the nanotube is press-bonded and fastened to the palladium covering film by the above-described coating film, the electrical continuity of the nanotube and palladium covering film can be securely maintained. Furthermore, since the area of tight adhesion between the nanotube and palladium covering film is protected from the outside by the above-described coating film, stable electrical continuity is maintained over a long period of time.

In the third aspect of the present invention, the base end portion of the nanotube is fused to the surface of the protruding portion of the cantilever by heating the base end portion of the nanotube; and various methods such as electric current flow, irradiation with light, irradiation with ions, irradiation with electrons, heat conduction and the like can be used as the heating means for fusing the nanotube. Furthermore, even if the base end portion of the nanotube is fused, since the melting point of palladium is 1555° C., and palladium has a high heat resistance, no peeling of the palladium covering film from the cantilever surface would occur. Furthermore, by performing the nanotube fusion process in a vacuum or in an inert gas, it is possible to suppress the adhesion of impurities to the nanotube probe needle.

In the fourth aspect of the present invention, conductivity is ensured by fastening the base end portion of the nanotube to the palladium covering film formed on the cantilever surface and by further coating this with a conductive covering film from above. Furthermore, since the base end portion of the nanotube is fastened by the superimposition of this conductive covering film, the nanotube can be firmly fastened to the cantilever surface. The fastening of the nanotube to the surface of the palladium covering film can utilize fastening means such as the above-described coating film, fusion or the like.

In the fifth aspect of the present invention, since the conductive covering film of the above-described fourth aspect is formed so as to cover the tip end portion and tip end of the nanotube, the nanotube probe needle can be endowed with the properties of a conductive substance. By using a probe that has such specified properties, it is possible to detect, with a high sensitivity, specified physical properties of a sample surface that is highly sensitive.

In the sixth aspect of the present invention, a conductive film that is extended so as to cover the tip end portion of the nanotube is constructed from a magnetic substance; accordingly, the nanotube probe needle can be endowed with the property of detecting the magnetism of the sample. In other words, the nanotube probe needle can be used as a probe needle for a magnetic force microscope (MFM). Furthermore, by scanning the sample surface by the nanotube probe needle, information relating to the magnetism of the sample surface at the atomic level is detected with a high sensitivity, so that a high-resolution magnetic image can be acquired. For example, this magnetic conductive covering film can be constructed from a ferromagnetic substance such as Fe, Co or Ni and can measure magnetic information relating to the sample surface with a high sensitivity.

In the seventh aspect of the present invention, since the conductive film which is extended so as to cover the tip end portion of the nanotube is constructed from a palladium covering film to which ferromagnetic metal atoms are added, the nanotube probe needle can be endowed with the property of detecting the magnetism of the sample. More specifically, the nanotube probe needle can be used as a probe needle for a magnetic force microscope (MFM). Ferromagnetic metals have a good compatibility with palladium and have the property of forming a uniform solution with palladium. Furthermore, since a palladium covering film containing ferromagnetic metals bonds strongly with the nanotube and the palladium covering film, a probe needle for a magnetic force microscope (MFM) can be provided which has high-durability performance with no peeling of the above-described film from the nanotube probe needle. Furthermore, by scanning the sample surface by the nanotube probe needle, information relating to the magnetism of the sample surface at the atomic level can be detected with a high sensitivity, so that a high-resolution magnetic image can be acquired.

In the eighth aspect of the present invention, since the palladium covering film additionally covers the cantilever surface including all or part of the base end portion of the nanotube, in contrast to a conventional nanotube probe in which a nanotube is fastened to the surface of the cantilever, the nanotube and palladium covering film can be simply endowed with conductivity. While the nanotube was fastened by first forming a palladium covering film on the cantilever surface in the first aspect, this sixth aspect is characterized in that a palladium covering film is formed after the nanotube is fastened to the cantilever. Even if the palladium covering film is thus formed afterward, the conductivity performance between the palladium covering film and the nanotube is ensured. Since the nanotube is already fastened to the cantilever surface by a coating film or fusion, and since a palladium covering film is formed on top of this, the fastening strength of the nanotube is greatly increased. At the same time, the conductivity performance between the nanotube and the palladium covering film is realized in the same manner as in the first aspect, so that a great improvement in fastening strength and conductivity is accomplished.

In the ninth aspect of the present invention, a palladium covering film is formed by means of palladium or a palladium alloy. Since palladium and palladium alloys have the property of bonding strongly with carbon and silicon, the palladium covering film adheres tightly to the nanotube and cantilever. Accordingly, the palladium covering film can be firmly bonded to the nanotube and can also be firmly bonded to the silicon or silicon nitride forming the cantilever. Furthermore, in addition to the above-described favorable adhesive properties, palladium also possesses a high electrical conductivity, with a volume resistivity of $10.0 \times 10^{-8}$ Ω·m at 0° C. and has electrical continuity characteristics comparable to those of platinum (Pt), which is used in STM probe needles.

DETAILED DESCRIPTION OF THE INVENTION

The inventors of the present application conducted diligent research concerning the development of a scanning microscope probe possessing conductivity. As a result of this research, the inventors hit upon a method for electrically connecting a nanotube and cantilever by means of a palladium covering film.

The basic structure is that a palladium covering film is formed on a cantilever, the base end portion of a nanotube is disposed in contact with a specified region on the surface of this palladium covering film, and the nanotube is fastened to and caused to be electrically continuous with the surface of the palladium covering film. Here, the reason for using a palladium covering film is that a palladium covering film has the property of forming a strong bond with the Si that constitutes the cantilever and also has the property of forming a strong bond with the C that constitutes the nanotube. Furthermore, like Au, Pt and Ti, a palladium covering film has good conductivity.

Furthermore, another basic structure is that an electrical continuity is established via a palladium covering film for a nanotube that is fastened to the surface of the protruding portion of the cantilever.

The two fastening methods described above can be used as methods for fastening a nanotube to the surface of a palladium covering film. In the first fastening method, all or part of the base end portion of the nanotube is fastened to a specified region on the surface of the palladium covering film by means of a coating film. In the second fastening method, the base end portion of the nanotube and the contact region on the surface of the palladium covering film are fused together.

Generally, nanotubes include conductive nanotube, such as carbon nanotubes and the like; and insulating nanotubes, such as BN type nanotubes, BCN type nanotubes and the like. However, if a palladium covering film is formed on the surface of such an insulating nanotube, the insulating nanotube can be transformed into a conductive nanotube. Nanotubes that can be used are not limited to carbon nanotubes, and nanotubes that have acquired conductivity as a result of working are also included.

Various types of methods, e.g., physical vapor deposition (PVD) methods such as vacuum evaporation, ion plating, sputtering and the like, chemical vapor deposition (CVD) methods, electroplating and the like can be used as the manufacturing method of the palladium covering film that is formed on the cantilever. The palladium covering film thus formed has the function of an electrode that allows the application of an external voltage. Furthermore, the coating film that fastens the nanotube to the cantilever is not limited to a carbonaceous substance; and conductive materials such as conductive deposited materials, metal deposited materials or the like may also be utilized.

Figure 1:
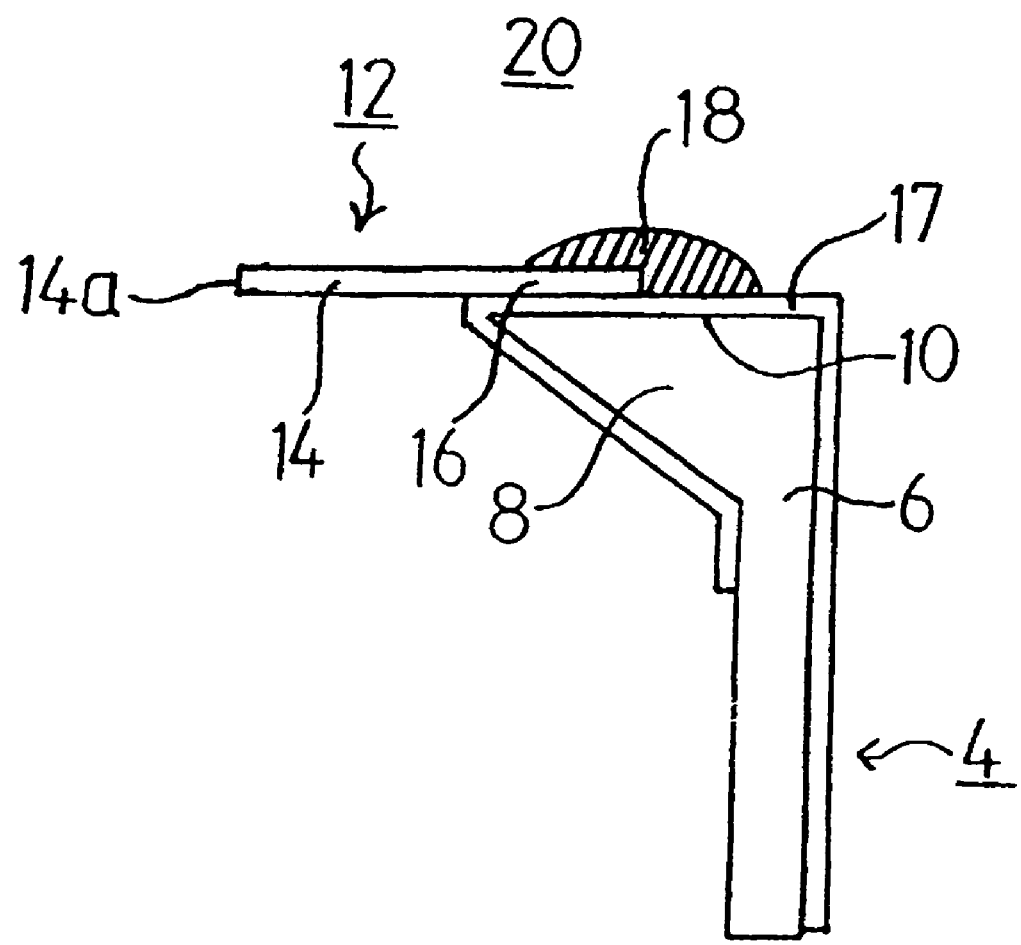
FIG. 1 is a schematic explanatory diagram of a first embodiment of the scanning microscope probe according to the present invention.

FIG. 1 is a schematic explanatory diagram of a first embodiment of the scanning microscope probe of the present invention.

The cantilever 4 is a member that is used as an AFM probe needle; and this cantilever 4 is comprised of a cantilever main portion 6 and a protruding portion 8 that is formed in protruding form on the tip end of the cantilever main portion 6. A palladium covering film 17 which extends from the surface of the cantilever main portion 6 to a specified region on the surface 10 of the protruding portion is formed on the cantilever 4. This palladium covering film 17 is formed from palladium or a palladium alloy and has good conductivity.

The base end portion 16 of the nanotube 12 is disposed in contact with the surface of the palladium covering film 17 on the surface 10 of the protruding portion 8. The tip end portion 14 of the nanotube 12 protrudes to the outside, and the tip end 14a of the tip end portion 14 constitutes a probe needle tip end for detecting signals. A coating film 18 is formed so as to cover all or part of the surface of the tip end portion 14, thus firmly fastening the nanotube 12 to the cantilever 4. As a result of this fastening, the base end portion 16 of the nanotube is fastened by press-bonding to the palladium covering film 17, and electrical conductivity is reliably ensured between the nanotube 12 and the palladium covering film 17.

The nanotube 12 is integrally fastened to the cantilever 4 by the above-described coating film 18, thus completing the scanning microscope probe 20 (hereafter referred to as a "probe"). This fastening method corresponds to the above-described first fastening method. Since the base end portion 16 of the nanotube 12 contacts the palladium covering film 17, these parts are electrically continuous. The palladium covering film 17 on the cantilever main portion 6 functions as an electrode film; as a result, energization of the conductive nanotube 12 is accomplished via this electrode film; in other words, i.e., an application of a voltage or passage of an electric current through the nanotube is made possible.

For the coating film 18, an insulating substance, semiconductor substance or conductive substance can be used as the material. Carbon type coating films that are formed by decomposing organic substances by means of an electron beam or ion beam are generally insulating films. Furthermore, by way of decomposing a metallo-organic substance, a conductive metal coating film is formed. The coating film 18 can be further formed by a physical vapor deposition method such as vacuum evaporation, ion plating, sputtering or the like; and a conductive covering film, a semiconductor coating film, and an insulating coating film can be formed by such coating methods. With the use of a conductive material such as a conductive deposited material, metal deposited material or the like for the coating film 18, the conductivity between the nanotube 12 and palladium covering film 17 can be even more securely established. For example, in cases where an insulating impurity is interposed between the base end portion 16 and the palladium covering film 17 for some reason, there is a possibility that the electrical continuity between the base end portion 16 and palladium covering film 17 will be impaired. In such cases, electrical continuity between the two parts is achieved by the conductive covering film 18. More specifically, in this embodiment, a double electrical continuity, which is comprised of a contact between the nanotube 12 and the palladium covering film 17 and an electrical continuity between these two parts by such a coating film, is ensured; and reliable continuity is assured.

Figure 2A:
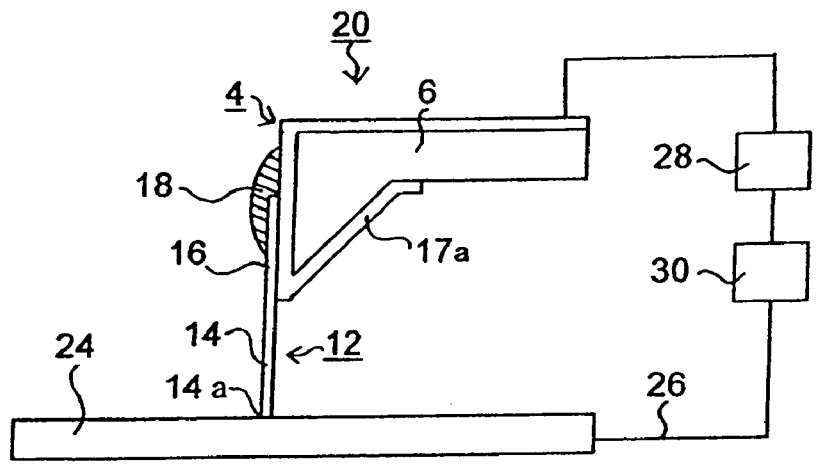
FIG. 2A shows a measurement layout diagram for the measurement of the electric current-voltage characteristics of the scanning microscope probe of the present invention.
Figure 2B:
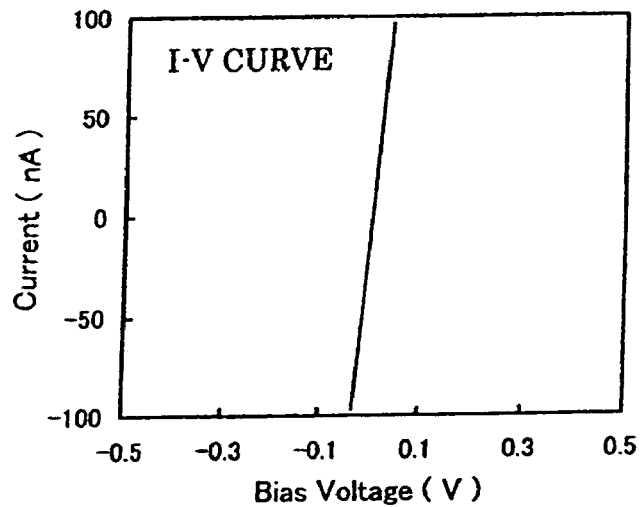
FIGS. 2B and 2C show measurement examples of the electric current-voltage curve that is measured.
Figure 2C:
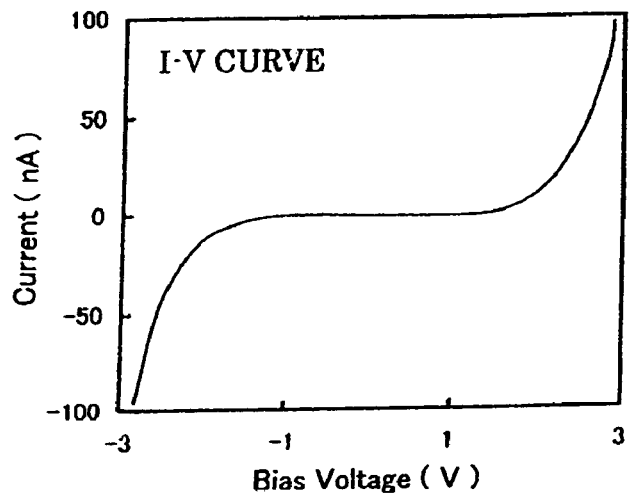

FIG. 2A is a measurement layout diagram for the measurement of the electric current-voltage characteristics of the scanning microscope probe of the present invention, and FIGS. 2B and 2C show the measurement examples of the electric current-voltage curve that is measured.

The probe 20 that is used for the measurement of electric current-voltage characteristics (I-V characteristics) has the same structure as in the first embodiment shown in FIG. 1; and the surface of the cantilever main portion 6 is covered by, in addition to the palladium covering film 17, various types of metal coating films 17a. FIG. 2A is a measurement layout diagram for the electric current-voltage characteristics measured by the probe 20. As seen from FIG. 2A, since the tip end 14a of the nanotube is in contact with the surface of the conductive sample 24, the nanotube 12 and the conductive sample 24 are provided in a state of electrical continuity. Accordingly, in cases where the metal coating film 17a and conductive sample 24 are connected by a conductor 26, and a voltage is applied across the metal coating film 17a and conductive sample 24 by means of the power supply 28, the electrical continuity of the base end portion of the nanotube and the metal coating film 17a can be investigated using an ammeter 30.

An Au coating film, Pt coating film or Ti coating film is used as the above-described metal coating film 17a. Au coating films and Pt coating films are generally widely used as electrode films, and Au coating films or Pt coating films have also been used as electrode materials in cases where cantilevers are endowed with conductivity as electric current detection probe needles. Furthermore, in field effect transistors (FETs) using semiconductor carbon nanotubes (semiconductor CNTs), Ti coating films have been used as electrodes in FETs using semiconductor CNTs. The reason for this is that Ti coating films show good adhesion to CNTs, and the work function of CNTs (4.5 eV) and the work function of Ti (4.33 eV) are close to each other. From this standpoint, the inventors of the present application believed that it would be possible to use Au coating films, Pt coating films and Ti coating films together with the palladium covering film 17 as metal coating films 17a on the cantilever. However, it became clear from the measurement, shown in FIG. 2A, of the I-V characteristics that a palladium covering film is overwhelmingly effective compared to Au coating films, Pt coating films and Ti coating films. More specifically, as will be described in detail below, a palladium covering film has much more suitable electrical continuity as a metal coating film 17a for endowing the nanotube 12 and cantilever 4 with electrical continuity.

Typical examples of measured I-V characteristics are shown in FIGS. 2B and 2C.

In FIG. 2B, the electric current relative to the bias voltage applied across the metal coating film 17a and conductive sample 24 shows the I-V characteristic of a typical conductor. More specifically, according to Ohm's law, the electric current I relative to the above-described bias voltage V increases linearly. In cases where an I-V characteristic such as that shown in FIG. 2B is obtained, the joint area between the base end portion 16 of the nanotube and the metal coating film 17a is judged to be in a "conductor" state in which there is a favorable electrical continuity.

On the other hand, in the case shown in FIG. 2C, the electric current I relative to the bias voltage V shows the I-V characteristic of a typical semiconductor. More specifically, the electric current relative to the above-described bias voltage shows a nonlinear increase above a specified bias voltage (threshold voltage). In cases where an I-V characteristic such as that shown in FIG. 2C is obtained, it is judged that the continuity in the joint area between the base end portion 16 of the nanotube and the metal coating film 17a is in a "semiconductor" state. In this semiconductor state, it appears that the characteristics are caused by the difference in work function between the joined metals, partial oxidation or the adhesion of contaminants or the like. In the "insulator" state, though this is not shown in the drawings), no electric current I flows even the bias voltage V is increased, so that the relationship of I=0 holds true. Respective cases in which Pd, Au, Pt and Ti form the metal coating film 17a will be described in detail below.

Table 1 below shows the electrical characteristics and manufacturing ratios of nanotubes covered by various metal coating films.

Probes 20 in which the base end portion 26 of a nanotube was fastened to one of four types (Pd coating film, Au coating film, Pt coating film and Ti coating film) of metal coating films 17a including a palladium covering film 17 were manufactured for each of the coating films, and the above-described I-V characteristics were measured. Table 1 classifies the I-V characteristics of the respective probes obtained by these measurements into "conductor", 'semiconductor" or "insulator" according to the above-described criteria and calculates the manufacturing ratios of conductor probes, semiconductor probes and insulator probes for each metal film. In other words, even if the metal film is of the same type, conductors, semiconductors and insulators appear in the proportions of the manufacturing ratios. Furthermore, the work function, which is an important parameter in the electrical continuity of metal-metal joints, is also shown for each metal coating film. In metal-metal joints, it may be inferred that the continuity of the joint part is improved as the work functions of the two metals show values that are closer to each other. The inventors of the present application, believing that this difference in work functions would also be an important parameter with regard to the electrical continuity in the joint area between the conductive nanotube 12 and metal coating film 17a, performed the analysis shown in Table 1.

TABLE 1

| Metal Film | Conductor | Semiconductor | Insulator | Work Function |
|---|---|---|---|---|
| Pd | 61% | 29% | 10% | 5.12 eV |
| Au | 17% | 0% | 83% | 5.10 eV |
| Pt | 28% | 46% | 26% | 5.65 eV |
| Ti | 0% | 48% | 52% | 4.33 eV |

At 61%, the manufacturing efficiency of the conductor in the palladium (Pd) coating film 17 is much higher that that in the other metal coating films 17a; and it became clear that among Pd, Au, Pt and Ti, the palladium covering film 17 is most suitable as a metal coating film. The work function of Ti is 4.33 eV, which is closest to the work function of 4.5 eV shown by a carbon nanotube (CNT). If this approach is adopted, Ti and CNT would be expected to show the best electrical continuity; however, it was found that the conductor manufacturing ratio of the probe 20 using a Ti coating film was actually the lowest. This fact is a result that completely contradicts the initial prediction. In other words, the favorable nature of a Pd coating film as a conductor is a novel result that betrays theoretical predictions. The inventors of the present application analyzed this result as follows. In the above-described measurements, the I-V characteristics were measured in the atmosphere in the same manner as in the operating environment of an AFM. In air, Ti tends to be oxidized; accordingly, there is a possibility that the Ti coating film was oxidized and converted into a titanium oxide coating film. Titanium oxide is a typical insulator; and in the case of the Ti coating film shown in Table 1, a majority of the I-V characteristics for the probe 20 show agreement with the results for an insulator. From these experimental results, it was ascertained for the first time by the inventors of the present application that a palladium covering film 17 which is stable in the atmosphere is most suitable as a metal coating film 17a for endowing an AFM probe with conductivity.

Furthermore, while an Au coating film has a work function that is comparable to that of a palladium covering film 17, 83% of the probes in this case are insulators. It is thus conceivable that there are large quantities of contaminants adhering to the surface of the Au coating film, and there is also a possibility that the adhesion between the Au coating film and the carbon atoms that constitute the nanotube is extremely low. Furthermore, in the case of Pt coating films as well, which are known to have a high stability in air, the manufacturing ratio of conductive probes is low, at approximately 27%. Pt coating films have the largest work function among the above-described metal coating films and show the greatest difference from the work function of 4.5 eV shown by the CNT that constitutes the nanotube 12. Accordingly, if there is an adhering contaminant, since Pt films have a large difference in work function from CNT, it is inferred that there is a high probability of the loss of continuity in probes 20 in which Pt coating films are used.

Figure 3:
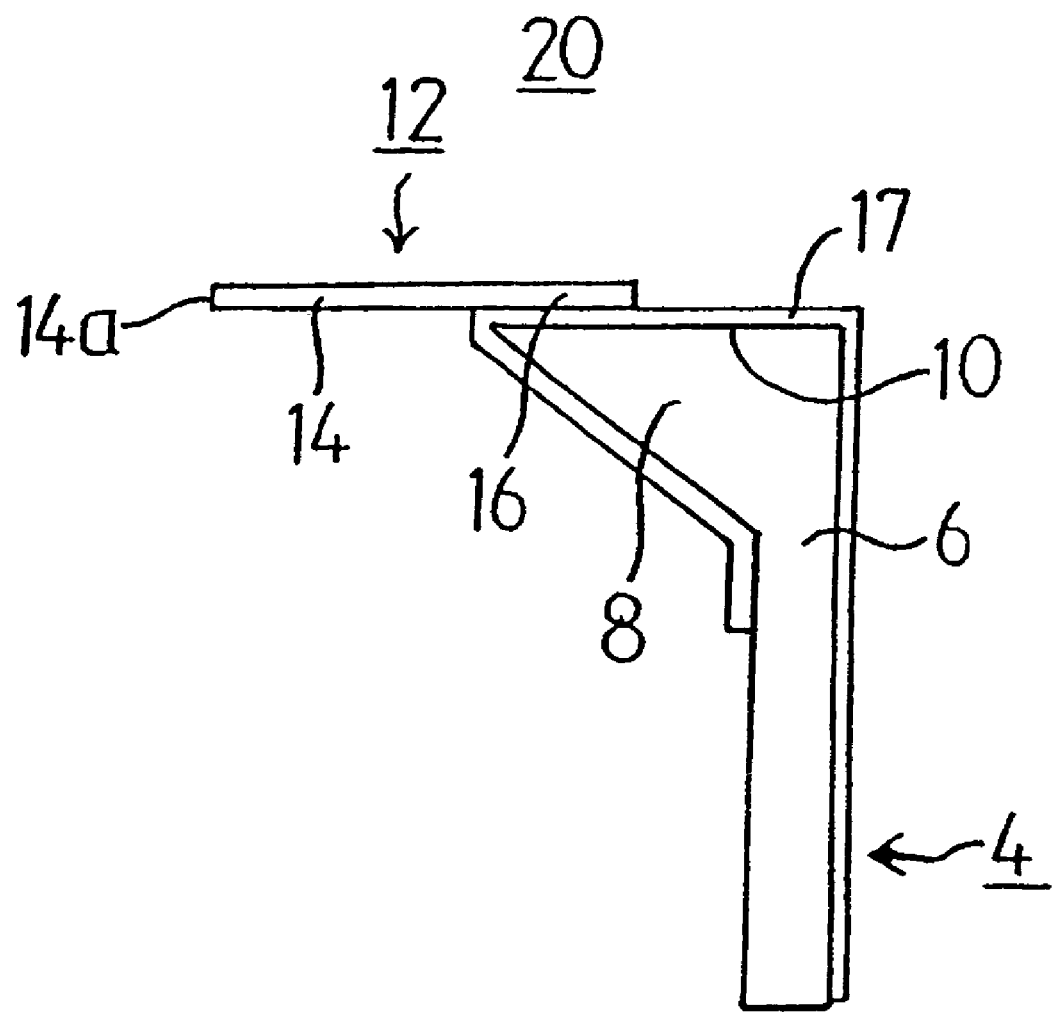
FIG. 3 is a schematic explanatory diagram of a second embodiment of the scanning microscope probe of the present invention.

FIG. 3 is a schematic explanatory diagram of a second embodiment of the scanning microscope probe of the present invention. Parts that are the same as in FIG. 1 are labeled with the same symbols, and a description of such parts is omitted; and only those parts that are different will be described below.

In this embodiment of FIG. 3, as in FIG. 1, a palladium covering film 17 that extends from the surface of the cantilever main portion 6 to a specified region on the surface 10 of the protruding portion 8 is formed on the cantilever 4. In this embodiment, the nanotube 12 is fastened to the surface 10 of the protruding portion 8 by the above-described second fastening method, i.e., by fusion.

The physical mechanism of this fastening method using fusion is electric currently unclear; however, the following mechanism may be inferred. For example, as a result of the injection of energy from the outside, the electron state in the base end portion of the nanotube is excited, so that a partial structural phase transition occurs in the nanotube, thus causing the base end portion 16 of the nanotube to be firmly fastened to the palladium covering film 17. More specifically, it appears that in the process of relaxation from the excited state of the electrons to the quasi-stable state, this quasi-stable state constructs a bonded state between the nanotube and the surface electrons that constitute the surface of the protruding portion. Needless to say, this view is merely one theory. Here, the excitation of the electron state can be brought about by the passage of an electric current through the nanotube, thermal excitation of the cantilever by heating, photo-excitation by irradiation with light, electron collisions by irradiation with an electron beam, ion collisions by irradiation with an ion beam or the like. Furthermore, there are various methods for causing fusion by the above-described thermal excitation, such as pinpoint heating of the base end portion 16 of the nanotube, electric current fusion in which the generation of Joule heat is caused by passing an electric current through the nanotube and the like. The inventors of the present application have already disclosed a fusion method using electron beam irradiation and an electric current fusion method in the above-described Japanese Patent Application Laid-Open (Kokai) No. 2000-249712.

Figure 4A:
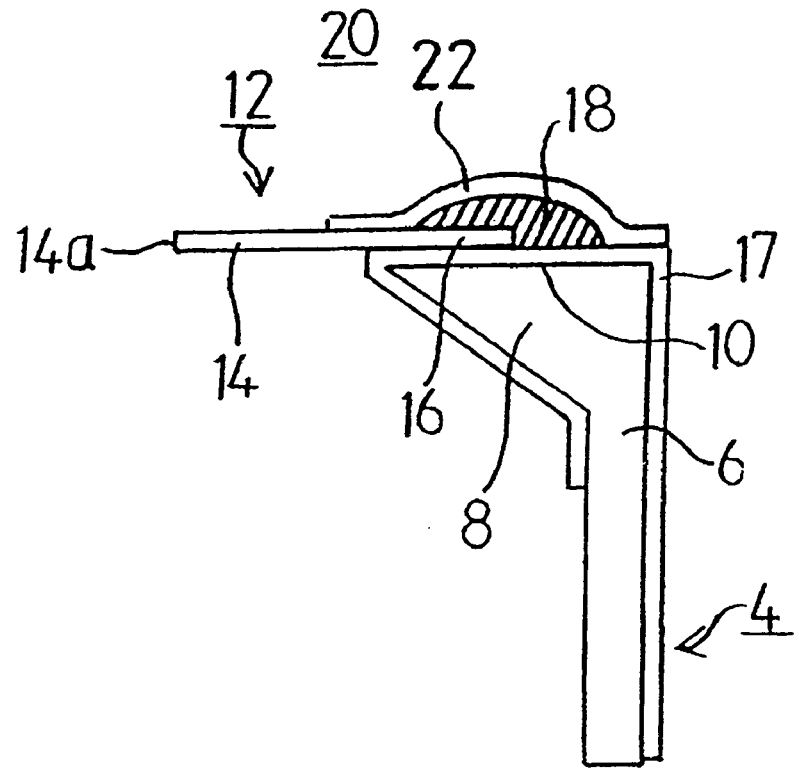
FIGS. 4A and 4B are schematic explanatory diagrams of a third embodiment of the scanning microscope probe according to the present invention.
Figure 4B:
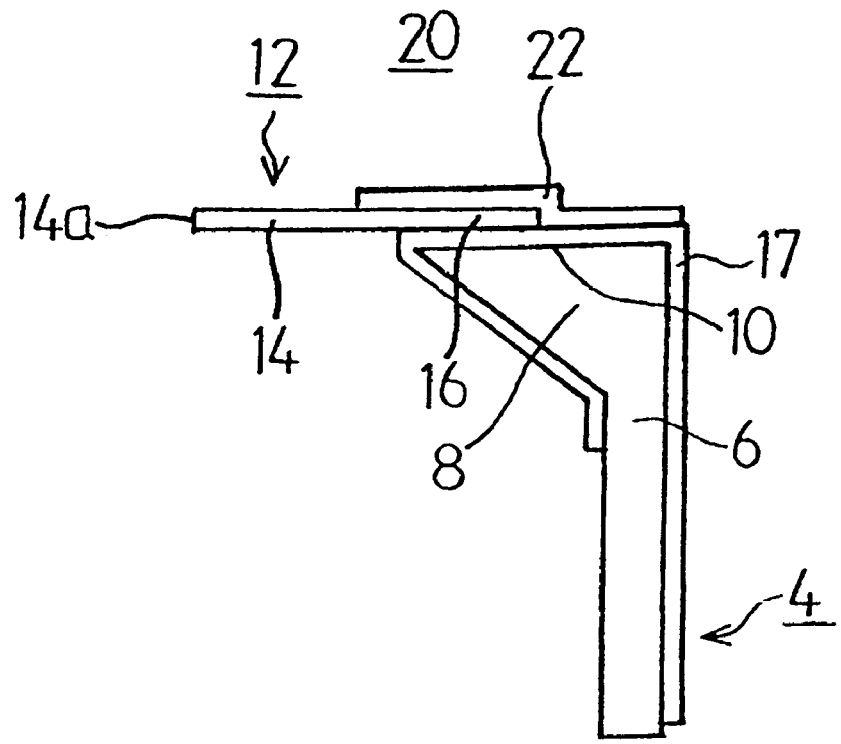

FIGS. 4A and 4B are schematic explanatory diagrams of a third embodiment of the scanning microscope probe of the present invention. In this third embodiment, a conductive covering film 22 is additionally formed in the first and second embodiments.

More specifically, this conductive covering film 22 is continuously formed on specified regions of the nanotube 12 and palladium covering film 17 so that the electrical continuity of the nanotube 12 and palladium covering film 17 is made even more reliable.

In FIG. 4A, the conductive covering film 22 is formed in the structure of the first embodiment. The conductive covering film 22 is formed so as to cover the coating film 18. In the configuration of FIG. 4B, the conductive covering film 22 is formed in the structure of the second embodiment. In other words, the conductive covering film 22 is formed in specified regions on the palladium covering film 17 and the base end portion 16 of the nanotube 12 that is fused to the surface of the palladium covering film 17.

It is sufficient if the conductive covering film 22 is formed in an electrically continuous manner on at least one portion of the nanotube 12 and one portion of the palladium covering film 17; and the size of these regions is determined appropriately.

Figure 5:
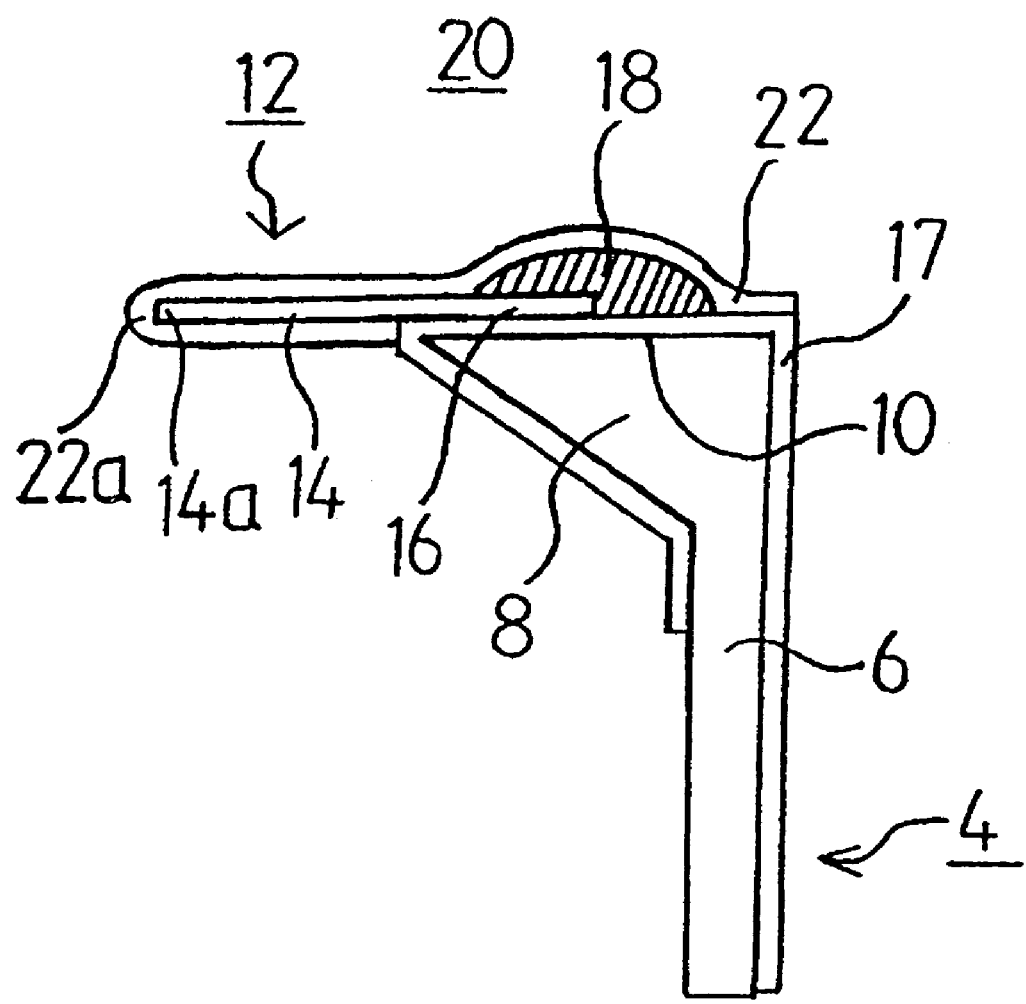
FIG. 5 is a schematic explanatory diagram of a fourth embodiment of the scanning microscope probe according to the present invention.

FIG. 5 is a schematic explanatory diagram of a fourth embodiment of the scanning microscope probe of the present invention.

In this fourth embodiment, the conductive covering film 22 of the third embodiment of FIG. 4A is extended so that this film covers the tip end portion 14 of the nanotube 12. Though not shown in the drawings, the conductive covering film 22 can also be constructed in the same manner in the structure of FIG. 4B. The conductive covering film 22 covers the tip end 22a and imparts the properties of a conductive substance to the probe needle. In cases where the conductive covering film 22 is constructed from ferromagnetic metal atoms such as Fe, Co or Ni, or in cases where this film is constructed from a palladium covering film to which ferromagnetic metal atoms are added, then the nanotube probe needle has the property of detecting the magnetism of the sample. In other words, magnetic images of the sample surface can be acquired.

Figure 6A:
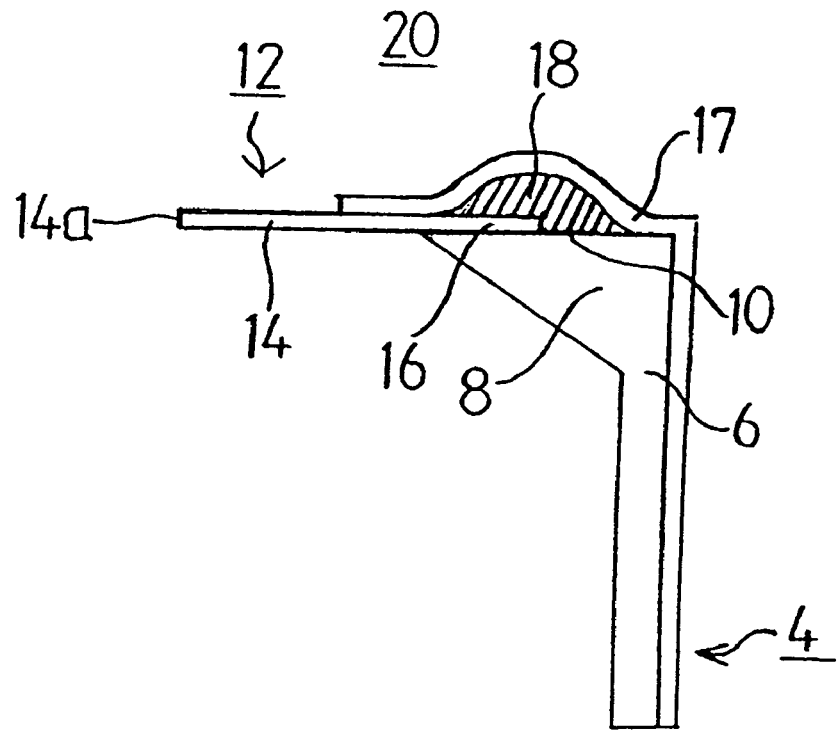
FIGS. 6A and 6B are schematic explanatory diagrams of a fifth embodiment of the scanning microscope probe according to the present invention.
Figure 6B:
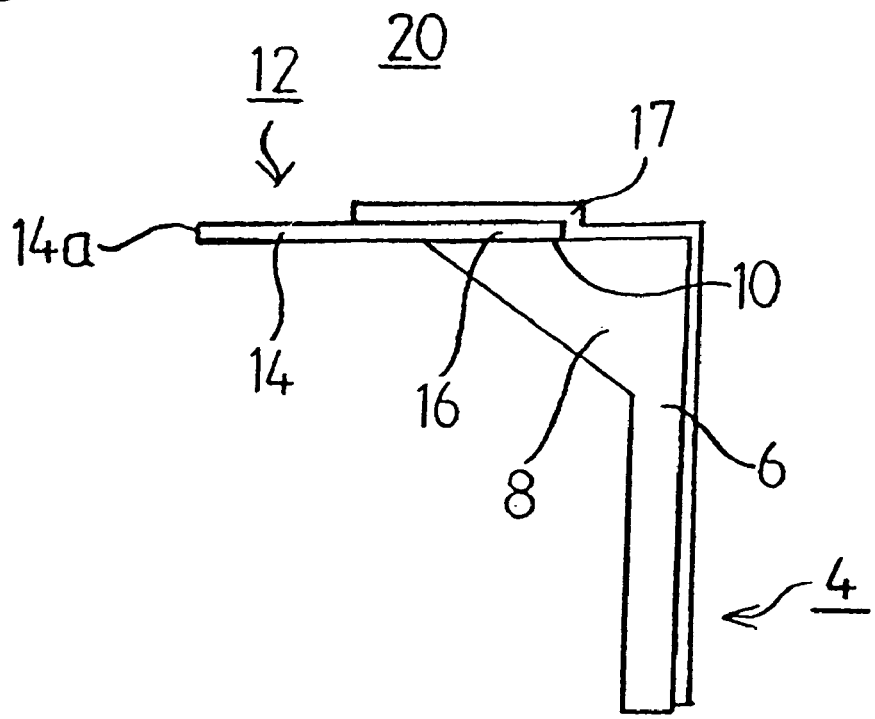

FIGS. 6A and 6B are schematic explanatory diagrams of a fifth embodiment of the scanning microscope probe of the present invention. This fifth embodiment is characterized in that a palladium covering film 17 is formed after the nanotube has been fastened to the cantilever.

More specifically, the order of formation is that the base end portion 16 of the nanotube 12 is fastened to the surface 10 of the protruding portion of the cantilever 4, and the probe 20 is then completed by forming a palladium covering film 17 from above.

In the structure of FIG. 6A, the base end portion 16 of the nanotube is fastened to the surface 10 of the protruding portion of the cantilever by the coating film 18, and a palladium covering film 17 is formed in the area that extends from the nanotube 12 to the cantilever main portion 6, thus covering this coating film 18. The palladium covering film 17 on the cantilever main portion 6 functions as an electrode film. Accordingly, electrical continuity between the nanotube 12 and cantilever 4 is established by this palladium covering film 17, and the application of a voltage to the nanotube 12 or passage of an electric current through the nanotube 12 by means of an external power supply is performed via this palladium covering film 17. In this probe 20, the nanotube 12 is fastened even more firmly by the palladium covering film 17, and the parts are endowed with conductivity by the palladium covering film 17. The palladium covering film 17 not only bonds strongly to the silicon or silicon nitride forming the cantilever main portion 6 but also forms a strong bond with the nanotube 12; accordingly, this also has the effect of reinforcing the fastening strength of the nanotube 12.

In the structure of FIG. 6B, the base end portion 16 of the nanotube is fastened to the surface 10 of the protruding portion 8 of the cantilever, and the probe 20 is completed by forming a palladium covering film 17 on the surface 10 of the protruding portion, so that all or part of the base end portion 16 of the nanotube is included in this film coverage. This probe 20 has a very simple structure and is constructed from only three members, i.e., the nanotube 12, cantilever main portion 6 and palladium covering film 17. Accordingly, the manufacturing process is also simple, and a scanning microscope probe 20 which has conductivity can be manufactured with good efficiency. Furthermore, as described above, the palladium covering film 17 bonds strongly to the nanotube 12 and has the function of firmly fastening the nanotube 12.

Figure 7:
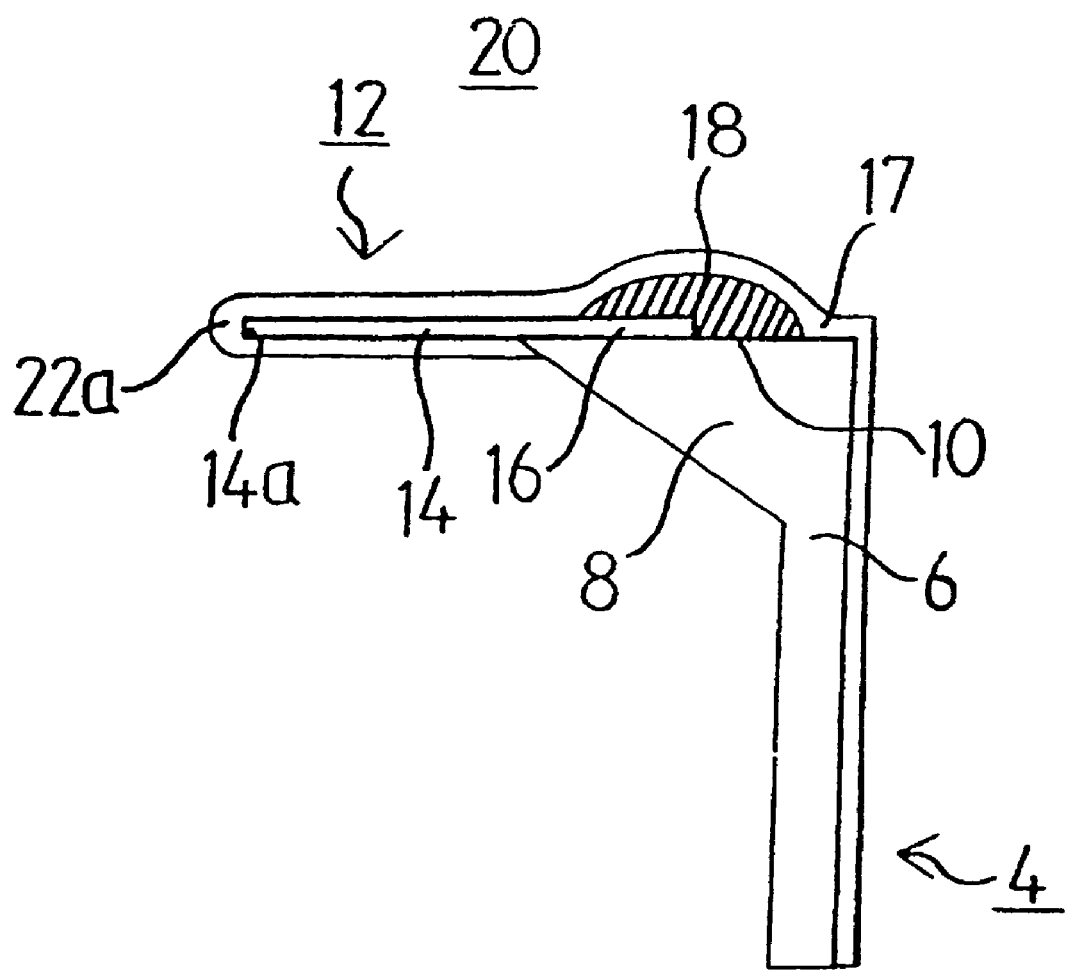
FIG. 7 is a schematic explanatory diagram of a sixth embodiment of the scanning microscope probe according to the present invention.

FIG. 7 is a schematic explanatory diagram of a sixth embodiment of the present invention.

This sixth embodiment is an embodiment in which the palladium covering film 17 in the fifth embodiment shown in FIG. 6A is extended so that this film 17 covers the tip end portion 14a of the nanotube. The palladium covering film 17 covers the tip end 14a of the nanotube; and thus the tip end 22a of the conductive covering film is formed on the probe 20, so that the probe needle is endowed with the properties of a conductive substance. The function of this probe needle is the same as that in the fourth embodiment, and a description thereof is omitted.

The present invention is not limited to the above-described embodiments, and it goes without saying that various modifications, design alterations and the like that may be made within limits that involve no departure from the technical concept of the present invention are included in the technical scope of the invention.

As seen from the above, in the scanning microscope probe of the present invention, a palladium covering film is formed as an electrode that imparts conductivity to the cantilever and nanotube probe needle. This palladium covering film bonds strongly to the substances of both the nanotube and the cantilever and can therefore firmly fasten the nanotube and cantilever together in addition to imparting conductivity to these elements. Since the scanning microscope probe of the present invention has a good conductive performance, an electric current can be supplied to the nanotube via the palladium covering film. As a result of this supply of electric current, the probe offers the convenience of allowing manipulation of the sample surface in various ways.

By way of coating the nanotube as a whole with a conductive substance, the probe can be used in an electric field force microscope (EFM) that detects the electric field force distribution by applying a voltage across the sample and probe needle.

Furthermore, by adding a magnetic material to the palladium covering film, it is also possible to use the probe in a magnetic force microscope (MFM) that detects magnetic interaction between the magnetic probe needle and the sample surface.

In the case of a chemical force microscope (CFM) or the like which images the surface distribution of chemical functional groups, new functions can be imparted to the functional groups by injecting electrons and positive holes.

By way of applying the scanning microscope probe of the present invention is to a conventional scanning microscope, a high resolution is obtained, and further new functions can be imparted.

The invention claimed is:

1. A probe for a scanning microscope which obtains information relating to physical properties of a sample surface by means of a tip end of a nanotube probe needle fastened to a cantilever, said probe comprising:

a palladium covering film formed on a surface of a specified portion of said cantilever, a nanotube provided on said cantilever so that a base end portion of said nanotube contracts a surface of said palladium covering film and a tip end portion of said nanotube protrudes from said cantilever, and a palladium covering film formed so as to additionally cover at least said base end portion of said nanotube.

2. The probe for a scanning microscope according to claim 1, wherein said palladium covering film additionally covering at least said base end portion of said nanotube is formed so as to cover said tip end portion of said nanotube, and is constructed from a palladium covering film to which ferromagnetic metal atoms are added.

3. The probe for a scanning microscope according to claim 1 or 2, wherein said palladium covering film, formed on said surface of said specified portion of said cantilever, and/or formed so as to additionally cover at lest said base end portion of said nanotube, is formed from one selected from the group consisting of palladium and a palladium alloy.

\* \* \* \* \*